United States Patent Office.

DAMON R. AVERILL, OF NEW CENTREVILLE, NEW YORK.

*Letters Patent No.* 19,729, *dated March* 23, 1858; *reissue No.* 3,814, *dated February* 1, 1870.

DIVISION B.

IMPROVEMENT IN THE MANUFACTURE OF VARNISHES.

The Schedule referred to in these Letters Patent and making part of the same

*To all whom it may concern:*

Be it known that I, DAMON R. AVERILL, of New Centreville, in the county of Oswego, and State of New York, have invented an Improvement in Varnish, composed of the ingredients, and compounded as set forth in the following specification, and with sufficient clearness to enable competent and skilful workmen in the arts to which it pertains, or is most nearly allied, to make and use my invention.

My said invention consists in the combination of water with acetate or other preparation of lead containing oxygen, with turpentine and coal-tar, for the purpose of making varnish, as hereinafter described, by which the varnish is rendered more adhesive, quicker-drying, and harder when dry.

This varnish is made of the ingredients and in the manner described; that is to say, I first boil two quarts of soft water in a suitable vessel, with three ounces of saleratus and three ounces of shellac, till the shellac is fully dissolved. I then boil or simmer, in an iron pot, one gallon of coal-tar, and add two ounces sugar of lead, two ounces red lead, and two ounces litharge, each previously ground in a little spirits of turpentine, and shortly after add four ounces of rosin, in fine powder.

These ingredients I boil together one hour. I then remove the vessel from the fire, and add two quarts of spirits of turpentine, and mix it in thoroughly by stirring.

I then add the water, gum-shellac, and saleratus, or its equivalents, previously prepared as above, taking care to incorporate the whole thoroughly by stirring, and the varnish is ready to be strained and set away for use.

This varnish is very useful as a cheap varnish for iron-work, and the rapidity with which it dries is a very important recommendation it its favor.

The action of the water and lead, and their combined effect upon the other ingredients, produce a rapidly-drying varnish, from materials which would otherwise be slow to become hard, and make a better varnish at a cheaper rate, as they save the expense of the excess of spirits of turpentine which would otherwise be necessary.

*Claim.*

What I claim as my invention, and desire to secure by Letters Patent, is—

The acetate of lead, or its equivalents, alkali, and water, in combination with pigments, as and for the purpose essentially as specified.

D. R. AVERILL.

Witnesses:
W. H. BURRIDGE,
J. H. BURRIDGE.